(12) United States Patent
Hong (10) Patent No.: US 6,644,579 B2
(45) Date of Patent: Nov. 11, 2003

(54) FISHING REEL ROTOR WITH ONE-WAY BRAKE ASSEMBLY

(76) Inventor: Eugene Hong, 11F-6, No. 333, Sec. 2, Hua-Mei W. St., Hsi-Tun Dist., Taichung City (TW)

( * ) Notice: Subject to any disclaimer, the term of this patent is extended or adjusted under 35 U.S.C. 154(b) by 9 days.

(21) Appl. No.: 10/073,360

(22) Filed: Feb. 13, 2002

(65) Prior Publication Data

US 2003/0150945 A1 Aug. 14, 2003

(51) Int. Cl.[7] .............................................. A01K 89/02
(52) U.S. Cl. ...................................... 242/247; 242/248
(58) Field of Search ................................ 242/247, 248

(56) References Cited

U.S. PATENT DOCUMENTS

| | | | | |
|---|---|---|---|---|
| 4,989,705 A | * | 2/1991 | Kashio et al. ................ | 192/45 |
| 6,050,512 A | * | 4/2000 | Jung .......................... | 242/247 |
| 6,056,222 A | * | 5/2000 | Hitomi ........................ | 242/247 |
| 6,481,656 B2 | * | 11/2002 | Jeong .......................... | 242/247 |

* cited by examiner

*Primary Examiner*—Kathy Matecki
*Assistant Examiner*—Evan Langdon
(74) *Attorney, Agent, or Firm*—Morgan Lewis & Bockius LLP (57) ABSTRACT

A fishing reel rotor includes an annular bearing seat secured to a mounting member and disposed around a driving rod. An outer brake ring is disposed fixedly within the bearing seat, and is disposed around a roller-positioning member, which is sleeved rotatably on an inner brake tube that is in turn sleeved non-rotatably on the driving rod. A plurality of rollers are retained on the roller-positioning member between the outer brake ring and the brake tube. A driving ring is disposed rotatably around the driving rod, is connected non-rotatably to the roller-positioning member, and is rotatable between a first position, where the driving rod is permitted to rotate in two directions, and a second position, where the driving rod is permitted to rotate in a single direction. A tension spring is disposed between the driving ring and the bearing seat so as to bias the driving ring to the second position.

3 Claims, 7 Drawing Sheets

FISHING REEL ROTOR WITH ONE-WAY BRAKE ASSEMBLY

BACKGROUND OF THE INVENTION

1. Field of the Invention

The invention relates to a fishing spool, more particularly to a fishing reel rotor with a one-way brake assembly which is movable between a braking position, where a fishline is prevented from unwinding from a reel rotor, and a release position, where the fishline is permitted to unwind from the reel rotor.

2. Description of the Related Art

Figure 1:
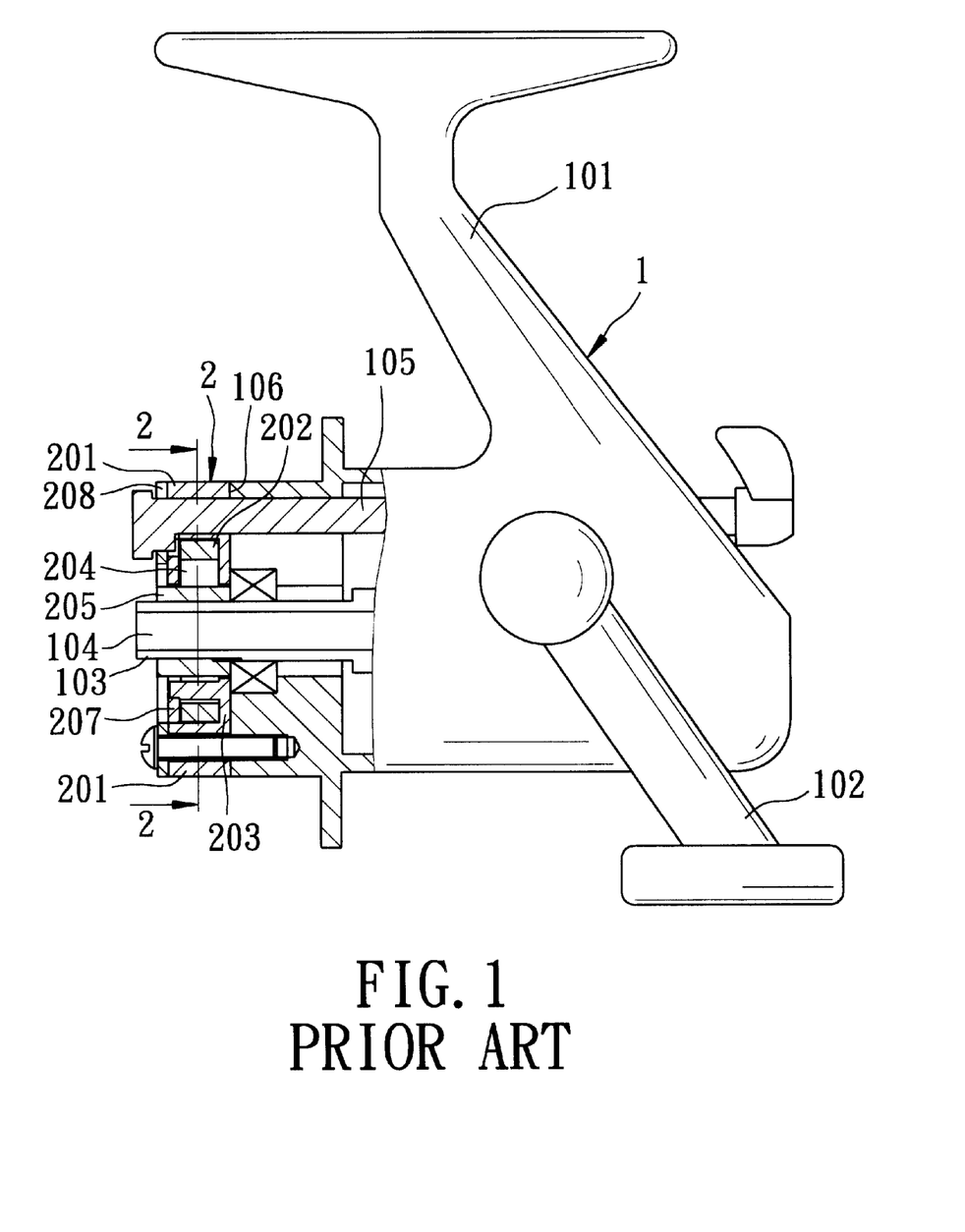
FIG. 1 is a partly sectional, fragmentary schematic side view of a conventional fishing reel rotor.
Figure 2:
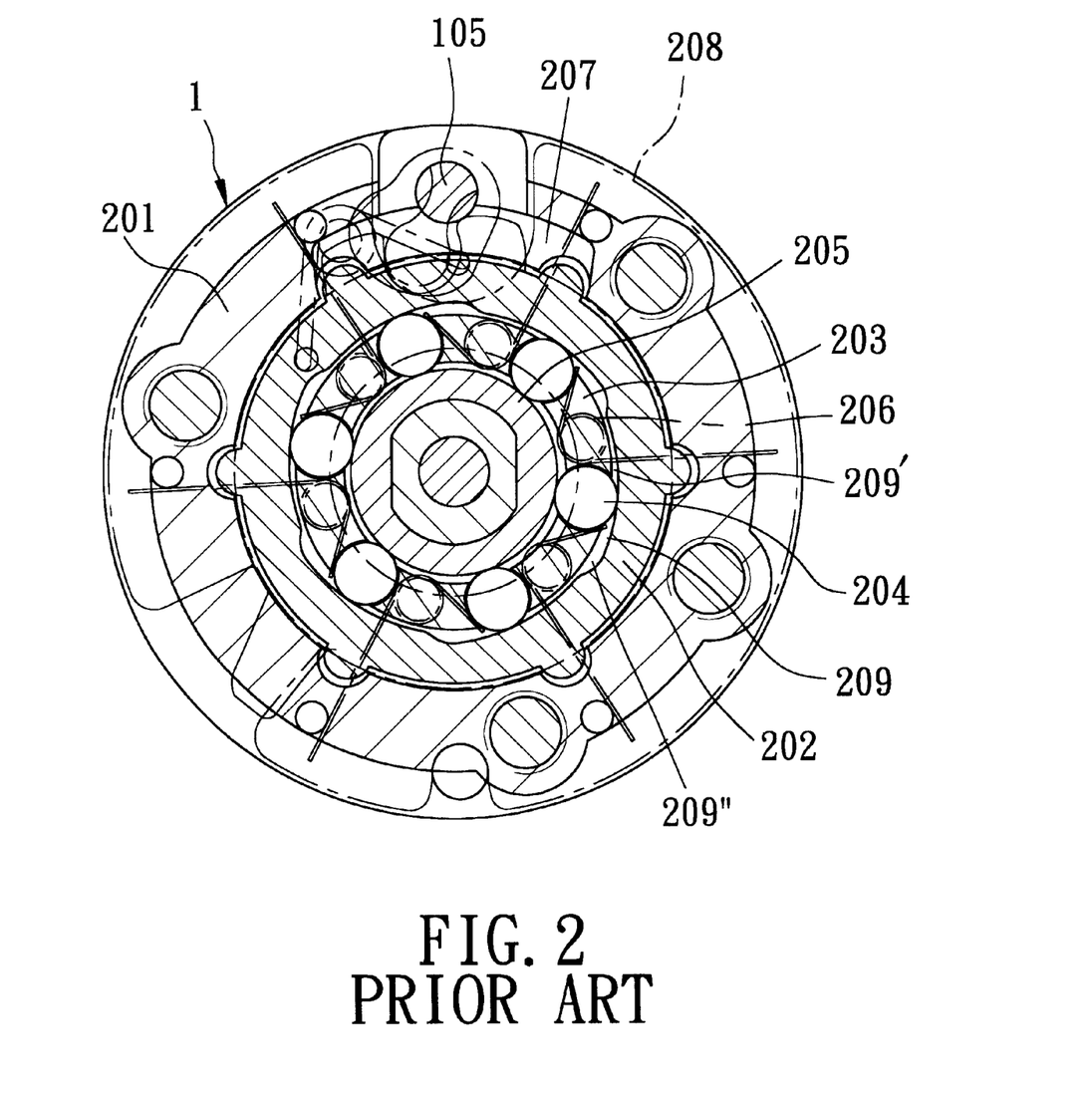
FIG. 2 is a sectional view taken along line 2—2 of FIG. 1.
Figure 3:
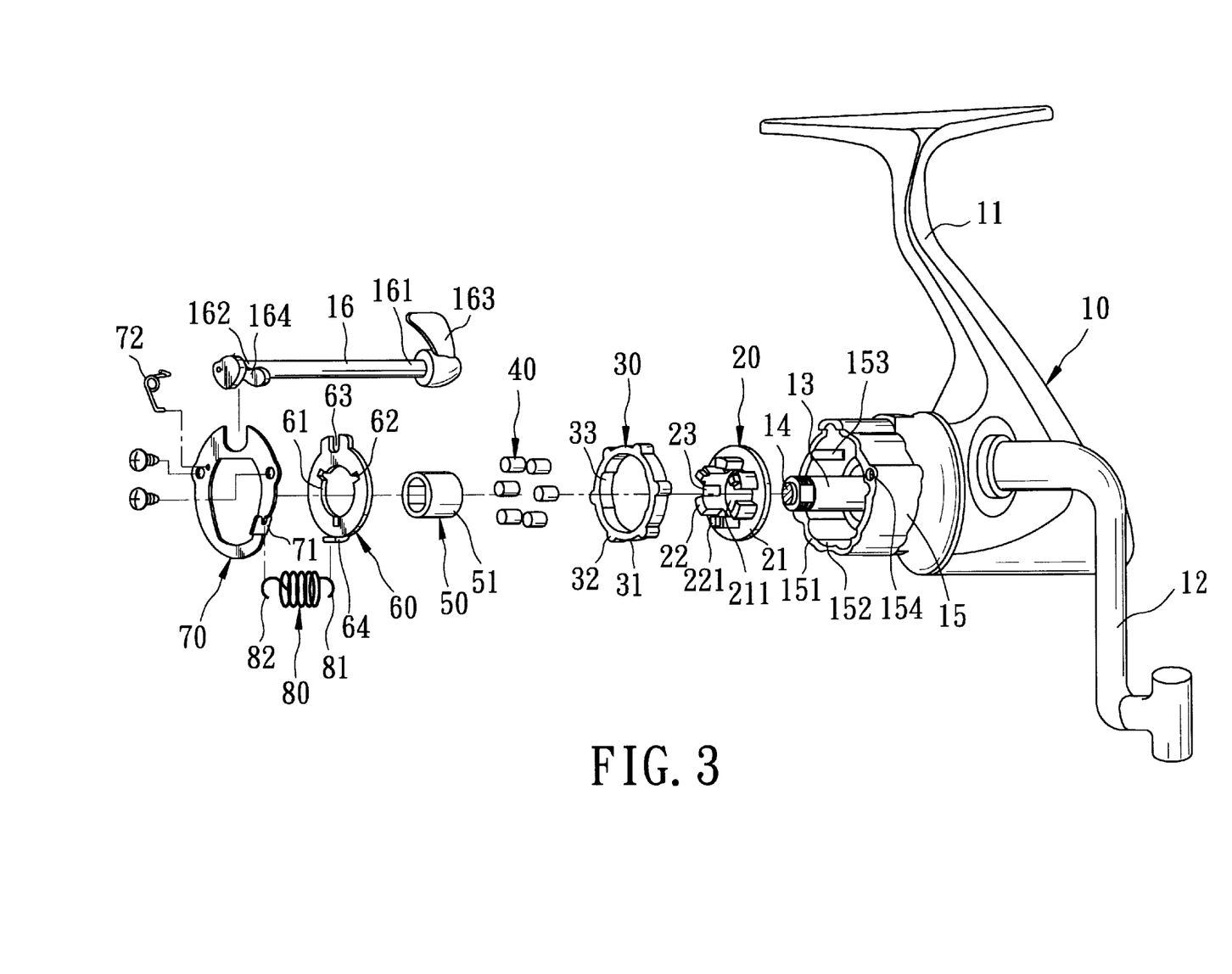
FIG. 3 is a fragmentary exploded perspective view of a preferred embodiment of a fishing reel rotor with a one-way brake assembly according to the invention.

Referring to FIGS. 1 and 2, a conventional fishing reel rotor is shown to include a main body 1 and a one-way brake assembly 2. The main body 1 includes a mounting member 101 adapted to be connected to a fishing rod (not shown), a rotary lever 102 disposed rotatably on the mounting member 101, a driving rod 103 journalled on the mounting member 101 and connected to the rotary lever 102 so as to be rotatable with the rotary lever 102, a movable shaft 104 disposed axially and movably within the driving rod 103, and a brake-controlling rod 105 journalled on the mounting member 101 and parallel to the movable shaft 104. The brake assembly 2 includes an annular bearing seat 201 mounted fixedly on an end face 106 of the main body 1 by screws, an outer brake ring 202 mounted fixedly within the bearing seat 201, a roller-positioning member 203 mounted rotatably within the outer brake ring 202, a plurality of rollers 204 disposed in the roller-positioning member 203, an inner brake tube 205 sleeved non-rotatably on the driving rod 103 and disposed within the bearing seat 201 and adjacent to the rollers 204, a plurality of torsion springs 206 disposed between the rollers 204 and the bearing seat 201, a driving ring 207 linked to the roller-positioning member 203 in the bearing seat 201 and connected operably to the brake-controlling rod 105, and a cover 208 that confines the outer brake ring 202, the rollers 204, the roller-positioning member 203, the inner brake tube 205, and the driving ring 207 within the bearing seat 201. The outer brake ring 202 has an inner surface formed with a plurality of grooves 209 that are arranged in a circumferential direction. Each of the grooves 209 has a shallow groove portion 209' and a deep groove portion 209".

When the brake-controlling rod 105 is manipulated, the driving ring 207 will bring the roller-positioning member 203 and the rollers 204 to rotate within the outer brake ring 202 so that the rollers 204 displace along the grooves 209 between the shallow and deep groove portions 209', 209". When the rollers 204 are located in the shallow groove portions 209', the inner brake tube 205 and the driving rod 103 can rotate in the roller-positioning member 203 in a single direction so as to prevent unwinding of a fishline from the spool. When the rollers 204 are located in the deep groove portions 209", the inner brake tube 205 and the driving rod 103 can rotate in the roller-positioning member 203 in two directions so as to permit winding and unwinding of the fishline with respect to the spool. The rollers 204 are biased by the torsion springs 206 into the shallow groove portions 209'.

However, the above-described fishing reel rotor suffers from the following drawbacks:

1. As a plurality of torsion springs 206 are required, and as the wire diameter of the torsion springs 206 is relatively small, assembly is not convenient.
2. Since the brake assembly 2 includes a relatively large number of components, and since the bearing seat 201 is fastened to the main body 1 by screws, a lot of assembly steps will be involved, and there may be cumulative tolerances of the components, so that the concentricity of the components cannot be preserved, thereby resulting in undesirable noise.
3. In addition, the screws may loosen after a period of use, and may thus affect the structural strength of the fishing reel rotor.

SUMMARY OF THE INVENTION

Therefore, the main object of the present invention is to provide a fishing reel rotor with a one-way brake assembly, which is relatively simple in construction, which can enhance structural strength, and which can preserve concentricity of the components.

Accordingly, a fishing reel rotor of the present invention is adapted to be connected removably to a fishing rod, and comprises:

a main body including
- a mounting member adapted to be connected removably to the fishing rod,
- a rotary lever disposed rotatably on the mounting member,
- a hollow driving rod journalled on the mounting member and connected to the rotary lever, the driving rod being rotatable on the mounting member when the rotary lever rotates,
- a movable shaft disposed axially and movably within the driving rod,
- an annular bearing seat connected fixedly to the mounting member and disposed around the driving rod, and
- a brake-controlling rod journalled on the mounting member and parallel to the driving rod, the brake-controlling rod being rotatable between a braking position and a release position;

a roller-positioning member having a ring plate that is mounted rotatably within the bearing seat and that is disposed around the driving rod, the ring plate having a side surface that is formed with a plurality of positioning blocks that project integrally and axially therefrom and that are arranged along a circle, each adjacent pair of the positioning blocks defining a roller-receiving space therebetween;

an outer brake ring mounted fixedly within the bearing seat and disposed around the positioning blocks of the roller-positioning member, the outer brake ring having an inner surface which is formed with a plurality of grooves that are arranged along a circumferential direction, each of the grooves having a shallow groove portion and a deep groove portion that is deeper than the shallow groove portion;

a plurality of rollers disposed respectively and movably within the roller-receiving spaces in the roller-positioning member;

an inner brake tube sleeved non-rotatably on the driving rod so as to rotate synchronously therewith, the inner brake tube being disposed within the roller-positioning member and having an outer surface that is adjacent to the rollers;

an annular driving ring disposed rotatably around the driving rod and within the bearing seat and connected non-rotatably to the roller-positioning member, the driving ring being connected operably to the brake-controlling rod and rotatable between a first position, where the brake-controlling rod is disposed at the release position and where the rollers are located within the deep groove portions of the grooves so as to permit bi-directional rotation of the driving rod and the inner brake tube within the roller-positioning member, and a second position, where the brake-controlling rod is disposed at the braking position and where the rollers are located within the shallow groove portions of the grooves, thereby permitting unidirectional rotation of the driving rod and the inner brake tube within the roller-positioning member;

an annular cover disposed around the driving rod and connected fixedly to the bearing seat so as to confine the roller-positioning member, the outer brake ring, the rollers, the inner brake tube, and the driving ring within the bearing seat; and a coiled tension spring having two ends that are fastened respectively to the cover and the driving ring, the tension spring being stretched when the driving ring is disposed at the first position so as to create a restoration force for biasing the driving ring to the second position.

Because only one spring, i.e., the tension spring, is incorporated in the fishing reel rotor, the structure of the fishing reel rotor is relatively simple.

Preferably, the bearing seat is formed integrally with the mounting member to enhance structural strength of the fishing reel rotor and to preserve concentricity of the components.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Referring to FIGS. 3 to 6, the preferred embodiment of a fishing reel rotor according to the present invention is shown to include a main body 10, and a one-way brake assembly which has a roller-positioning member 20, an outer brake ring 30, a plurality of rollers 40, an inner brake tube 50, an annular driving ring 60, an annular cover 70, and a coiled tension spring 80.

The main body 10 includes a mounting member 11 adapted to be connected removably to a fishing rod (not shown), a rotary lever 12 disposed rotatably on the mounting member 11, a hollow driving rod 13 journalled on the mounting member 11 and connected to the rotary lever 12 so as to be rotatable on the mounting member 11 when the rotary lever 12 rotates, a movable shaft 14 disposed axially and movably within the driving rod 13, an annular bearing seat 15 formed integrally with the mounting member 11 and disposed around the driving rod 13, and a brake-controlling rod 16 journalled on the mounting member 11 and parallel to the driving rod 13. As the interconnection and operation of the rotary lever 12, the driving rod 13 and the movable shaft 14 are not crucial to the invention, a detailed description thereof is dispensed with herein for the sake of brevity. The bearing seat 15 has an annular wall 151 confining a recess 152. A plurality of slots 153 are formed in an inner wall surface of the annular wall 151. The brake-controlling rod 16 is rotatable between a braking position and a release position, and includes an operating end portion 161 and a braking end portion 162 opposite to the operating end portion 161. The operating end portion 161 and the braking end portion 162 respectively project from two opposite end faces of the main body 10. An actuating portion 163 is fixedly disposed on the operating end portion 161. A braking block 164 is secured to the braking end portion 162.

The roller-positioning member 20 has a ring plate 21 that is mounted rotatably within the recess 152 in the bearing seat 15, that is disposed around the driving rod 13, and that confines a through hole 211. The ring plate 21 has a side surface formed with a plurality of positioning blocks 22 that project integrally and axially therefrom and that are arranged along a circle. Each adjacent pair of the positioning blocks 22 defines a roller-receiving space 23 therebetween. In addition, a plurality of keys 221 extend integrally from end surfaces of the positioning blocks 22 in a staggered manner.

The outer brake ring 30 is mounted fixedly within the recess 152 in the bearing seat 15, and is disposed around the positioning blocks 22 of the roller-positioning member 20. The outer brake ring 30 has a surrounding wall 31 with opposite inner and outer surfaces, which are respectively formed with a plurality of grooves 33 and a plurality of ribs 32. The grooves 33 are arranged along a circumferential direction, and correspond respectively and substantially to the roller-receiving spaces 23. As best seen in FIG. 6, each of the grooves 33 has a shallow groove portion 331, and a deep groove portion 332 that is deeper than the shallow groove portion 331. The ribs 32 engage respectively the slots 153 in the inner wall surface of the bearing seat 15 to thereby prevent rotation of the outer brake ring 30 within the bearing seat 15.

The rollers 40 are disposed respectively and movably within the roller-receiving spaces 23 in the roller-positioning member 20.

The inner brake tube 50 is sleeved non-rotatably on the driving rod 13 so as to rotate synchronously therewith, and is fitted in the through hole 211 in the roller-positioning member 20. The inner brake tube 50 is disposed within the roller-positioning member 20, and has an outer surface 51 that is adjacent to the rollers 40.

The driving ring 60 is disposed rotatably around the driving rod 13 and within the recess 152 in the bearing seat 15, confines a through bore 61, and has an inner periphery formed with a plurality of angularly spaced-apart keyways 62 that engage respectively the keys 221 on the positioning blocks 22 so as to permit synchronous rotation of the roller-positioning member 20 and the driving ring 60, and an outer peripheral portion formed integrally with a lug 64 and a braking groove 63. The braking block 164 is in sliding engagement with the braking groove 63 such that the driving ring 60 is rotatable between a first position, where the brake-controlling rod 16 is disposed at the release position and where the rollers 40 are located within the deep groove portions 332 of the grooves 33 so as to permit bi-directional rotation of the driving rod 13 and the inner brake tube 50 within the roller-positioning member 20, and a second position, where the brake-controlling rod 16 is disposed at the braking position and where the rollers 40 are located within the shallow groove portions 331 of the grooves 33, thereby permitting unidirectional rotation of the driving rod 13 and the inner brake tube 50 within the roller-positioning member 20.

The cover 70 is connected fixedly to an annular end surface of the annular wall 151 by means of screws that engage threaded holes 154 formed in the end surface so as to close an end of the recess 152, thereby confining the roller-positioning member 20, the outer brake ring 30, the rollers 40, the inner brake tube 50, and the driving ring 60 within the bearing seat 15. The cover 70 has an outer peripheral portion which is formed integrally with a lug 71 that is disposed opposite to the lug 64. A torsion spring 72 links the cover 70 to the braking block 164 in a known manner so as to bias the brake-controlling rod 16 to the braking position and the release position.

The tension spring 80 is disposed to bias the driving ring 60 to the second position, and has two opposite ends 81, 82 that are fastened respectively to the lug 64 of the driving ring 60 and the lug 71 of the cover 70. The tension spring 80 is stretched when the driving ring 60 is disposed at the first position so as to create a restoration force for biasing the driving ring 60 to the second position.

Figure 4:
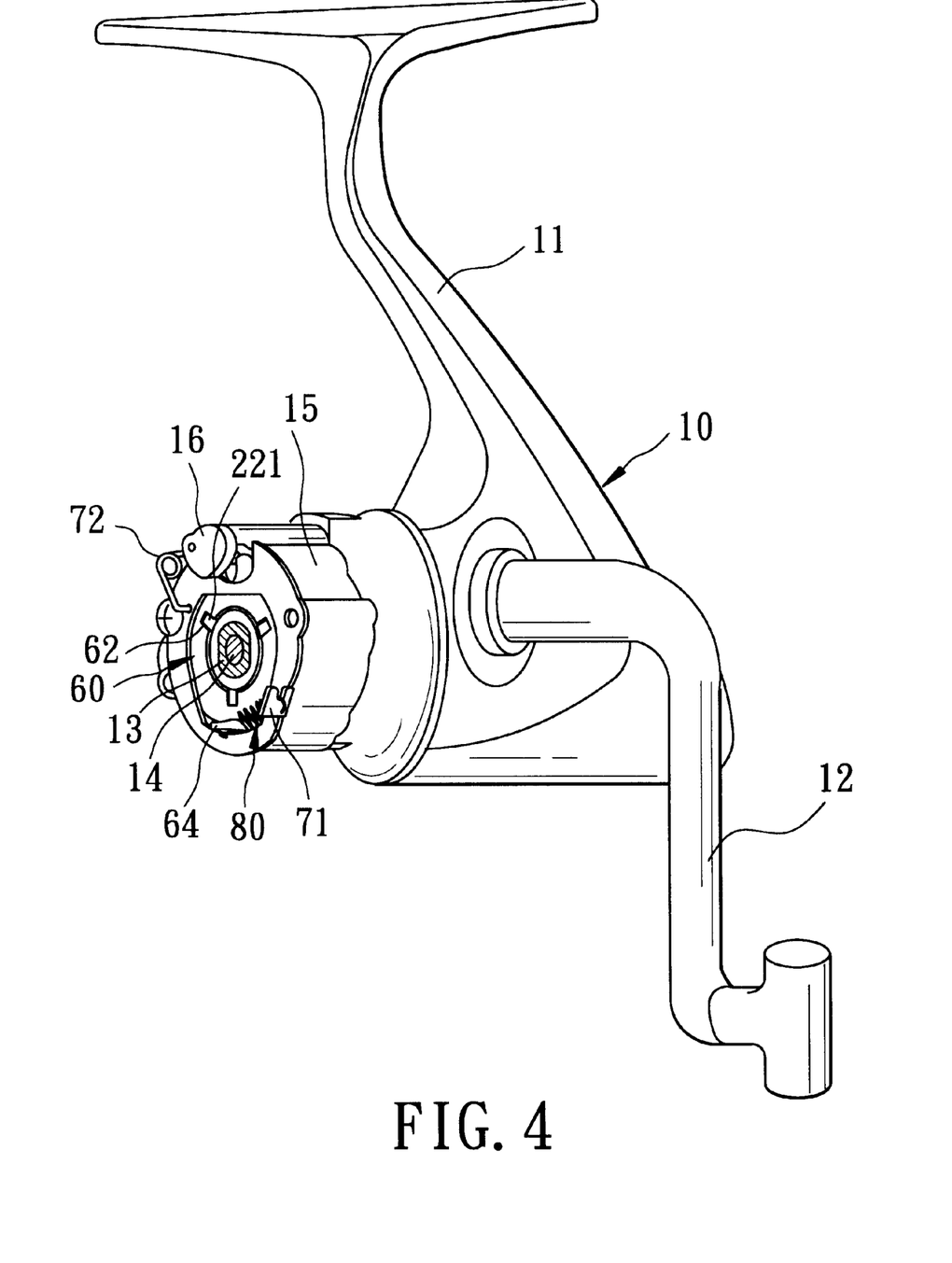
FIG. 4 is a partly sectional, fragmentary perspective view of the preferred embodiment in an assembled state.
Figure 5:
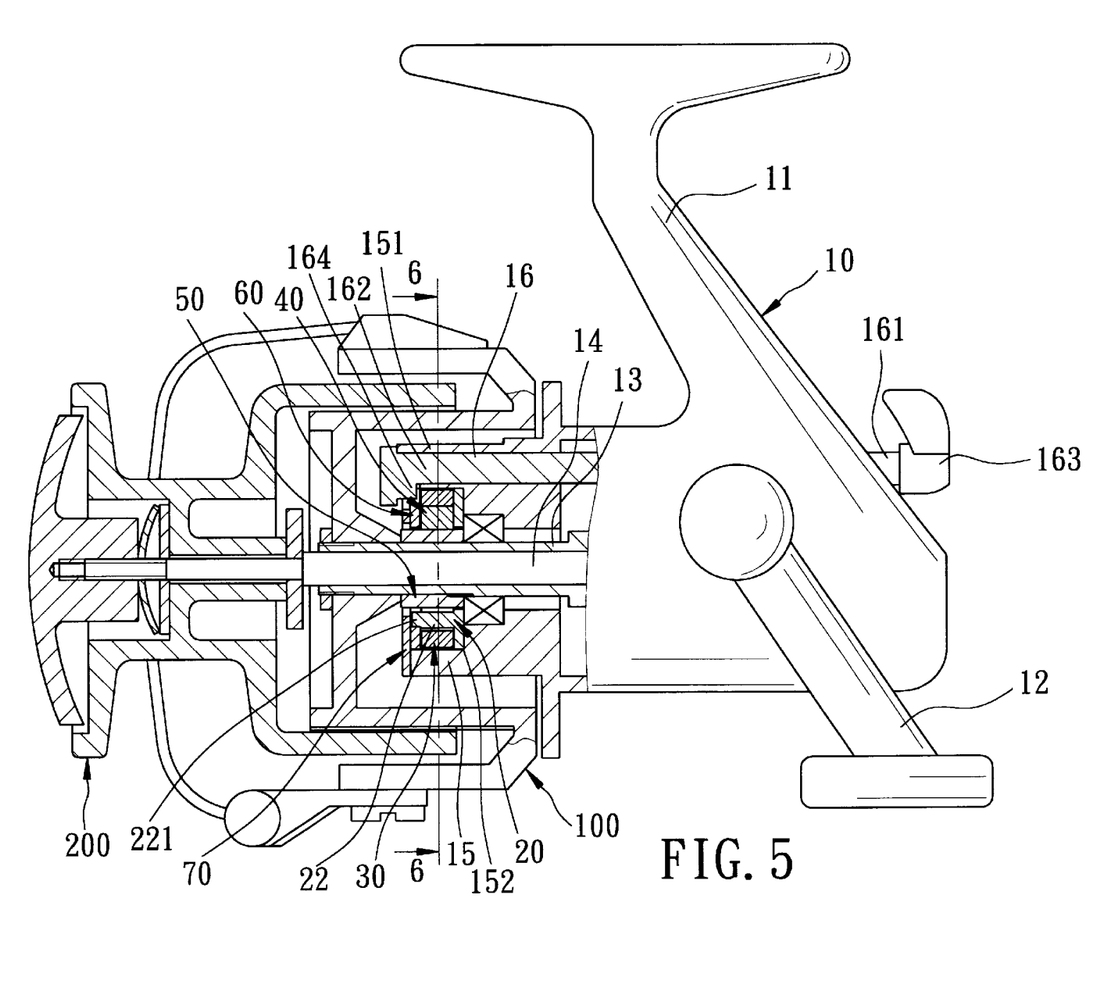
FIG. 5 is a partly sectional side view of the preferred embodiment in an assembled state.
Figure 6:
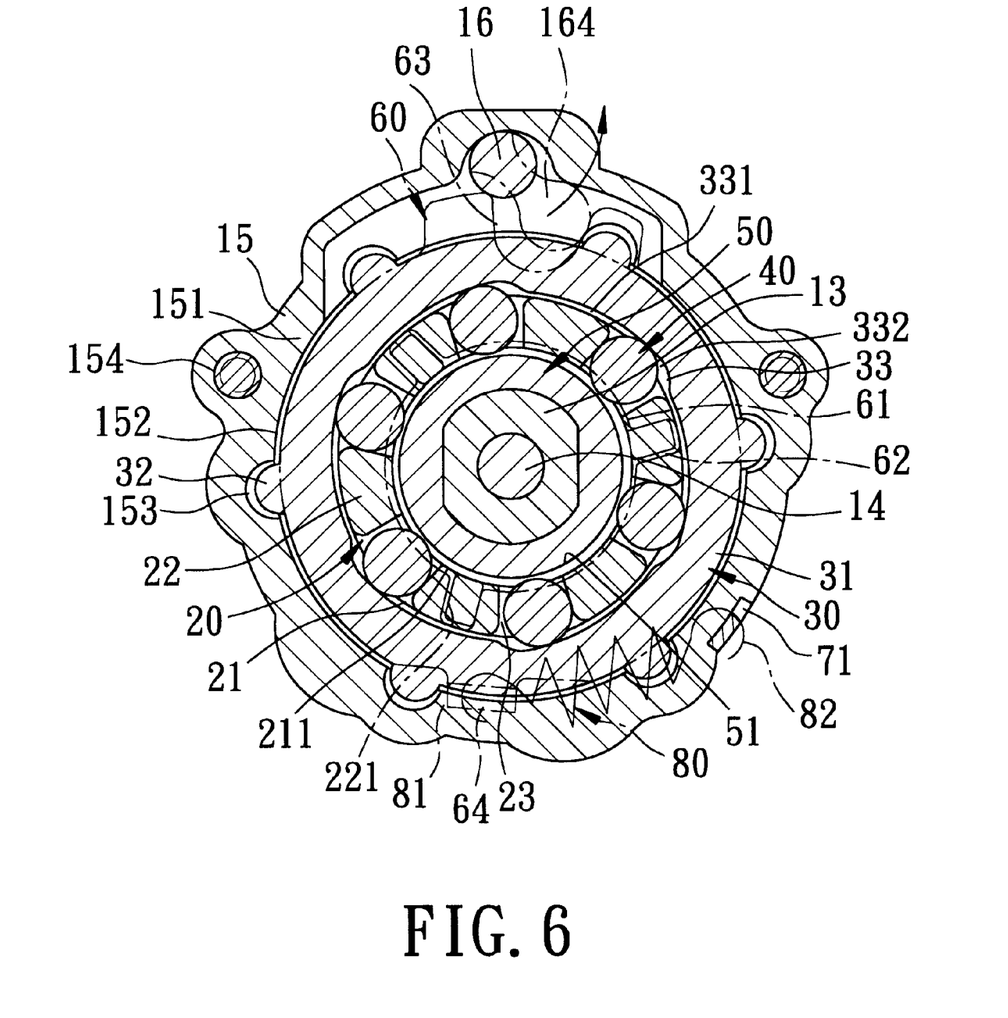
FIG. 6 is a sectional view taken along line 6—6 of FIG. 5, in which the brake assembly is in a release position.

Referring to FIGS. 4, 5, and 6, after assembly of the aforesaid components of the fishing reel rotor according to the invention, the rollers 40 are interposed between the inner brake tube 50 and the outer brake ring 30. The roller-positioning member 20 engages the driving ring 60 by virtue of the keys 221 and the keyways 62. It is noted that the arrangement of a single key 221 and a single keyway 62 can also achieve the intended effect. The driving ring 60 is in turn connected to the cover 70 via the tension spring 80. As shown in FIG. 5, distal ends of the driving rod 13 and the movable shaft 14 are respectively adapted for mounting of a winding unit 100 that can rotate relative to the main body 10, and a spool 200 that can reciprocate axially relative to the main body 10.

When the brake-controlling rod 16 is turned to the release position, as shown in FIG. 6, the braking block 164 will rotate the driving ring 60 to the first position. At this time, the tension spring 80 is stretched to create a restoration force, and the driving ring 60 brings the roller-positioning member 20 and the rollers 40 to rotate relative to the grooves 33 in the outer brake ring 30 so that the rollers 40 are located within the deep groove portions 332. As such, there is a clearance between the outer surface 51 of the inner brake tube 50 and the rollers 40 so that the rotary lever 12, the driving rod 13, and the winding unit 100 can rotate relative to the mounting member 11 in two directions.

Figure 7:
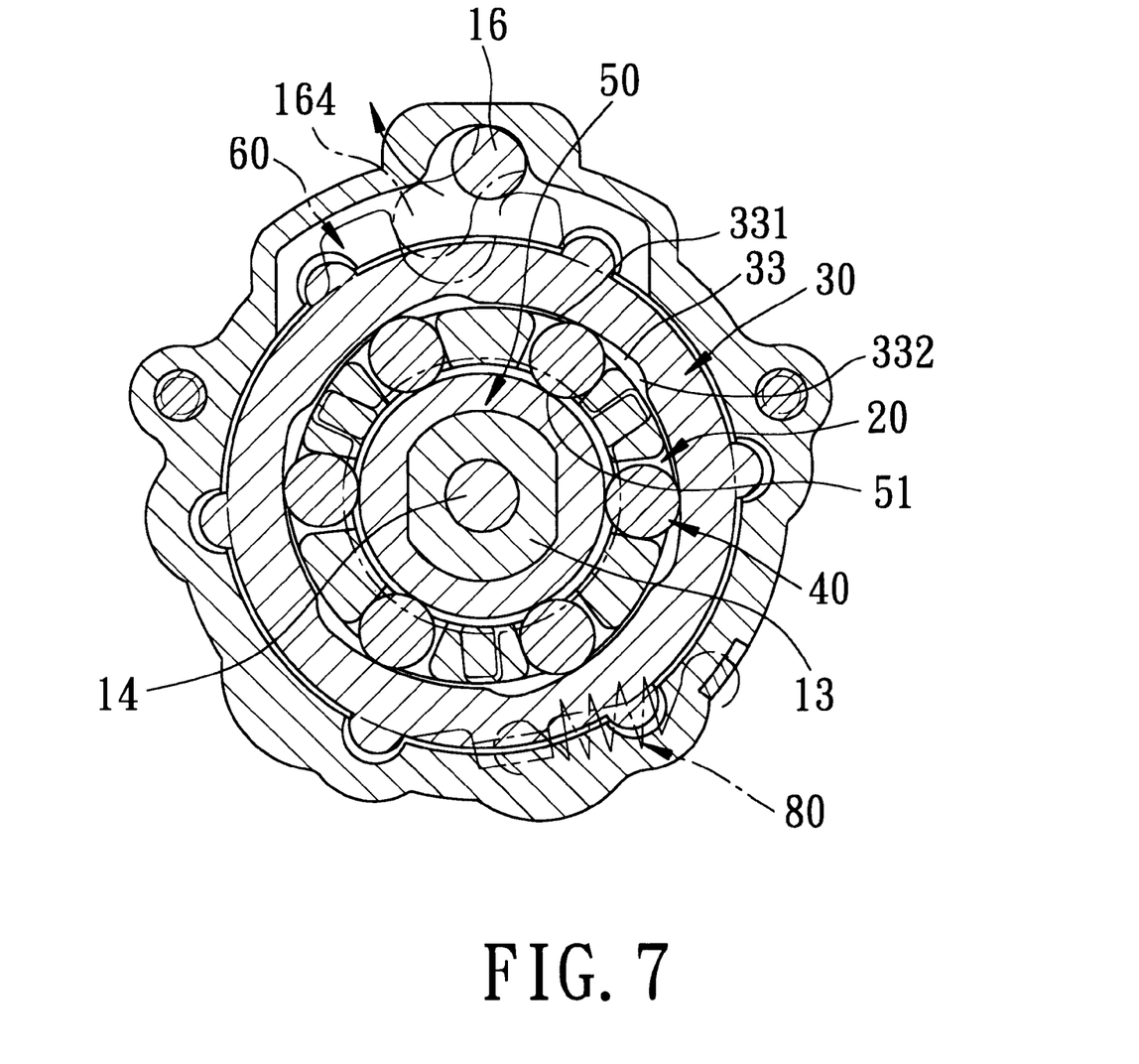
FIG. 7 is a view similar to FIG. 6, illustrating the brake assembly in a braking position.

On the contrary, when the brake-controlling rod 16 is rotated to the braking position, as shown in FIG. 7, the braking block 164 will rotate the driving ring 60 counter-clockwise to the second position, where the tension spring 80 is restored to its original shape, and where the rollers 40 are located in the shallow groove portions 331 and are stuck between the inner brake tube 50 and the outer brake ring 30. As such, the rotary lever 12, the driving rod 13 and the winding unit 100 can rotate relative to the mounting member 11 in a single direction so as to prevent unwinding of the fishline from the spool 200.

It is noted that the bearing seat 15 according to the invention is formed integrally with the main body 10. As such, the concentricity of the bearing seat 15 and the driving rod 13 can be preserved to facilitate subsequent processing and to prevent possible errors during assembly. Besides, product performance can be enhanced, and costs can be reduced. Furthermore, the use of a single tension spring 80 to bias the driving ring 60 results in a simpler construction, lower costs, and convenient assembly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A fishing reel rotor adapted to be connected removably to a fishing rod, said fishing reel rotor comprising:
   a main body including
      a mounting member adapted to be connected removably to the fishing rod,
      a rotary lever disposed rotatably on said mounting member,
      a hollow driving rod journalled on said mounting member and connected to said rotary lever, said driving rod being rotatable on said mounting member when said rotary lever rotates,
      a movable shaft disposed axially and movably within said driving rod,
      an annular bearing seat connected fixedly to said mounting member and disposed around said driving rod, and
      a brake-controlling rod journalled on said mounting member and parallel to said driving rod, said brake-controlling rod being rotatable between a braking position and a release position;
   a roller-positioning member having a ring plate that is mounted rotatably within said bearing seat and that is disposed around said driving rod, said ring plate having a side surface that is formed with a plurality of positioning blocks that project integrally and axially therefrom and that are arranged alone a circle, each adjacent pair of said positioning blocks defining a roller-receiving space therebetween;
   an outer brake ring mounted fixedly within said bearing seat and disposed around said positioning blocks of said roller-positioning member, said outer brake ring having an inner surface which is formed with a plurality of grooves that are arranged alone a circumferential direction, each of said grooves having a shallow groove portion and a deep groove portion that is deeper than said shallow groove portion;
   a plurality of rollers disposed respectively and movably within said roller-receiving spaces in said roller-positioning member;
   an inner brake tube sleeved non-rotatably on said driving rod so as to rotate synchronously therewith, said inner brake tube being disposed within said roller-positioning member and having an outer surface that is adjacent to said rollers;
   an annular driving ring disposed rotatably around said driving rod and within said bearing seat and connected non-rotatably to said roller-positioning member, said driving ring being connected operably to said brake-controlling rod and being rotatable between a first position, where said brake-controlling rod is disposed at said release position and where said rollers are located within said deep groove portions of said grooves so as to permit bi-directional rotation of said driving rod and said inner brake tube within said roller-positioning member, and a second position, where said brake-controlling rod is disposed at said braking position and where said rollers are located within said shallow groove portions of said grooves, thereby permitting unidirectional rotation of said driving rod and said inner brake tube within said roller-positioning member, wherein said driving ring has an inner periphery that is formed with a keyway, each of said positioning blocks of said roller-positioning member having an end surface, said roller-positioning member further having a key that extends integrally from said end surface of one of said positioning blocks and that engages said keyway so as to permit synchronous rotation of said roller-positioning member and said driving ring;

an annular cover disposed around said driving rod and connected fixedly to said bearing seat so as to confine said roller-positioning member, said outer brake ring, said rollers, said inner brake tube, and said driving ring within said bearing seat; and a coiled tension sprint having two ends that are fastened respectively to said cover and said driving ring, said tension sprint being stretched when said driving ring is disposed at said first position so as to create a restoration force for biasing said driving ring to said second position.

2. The fishing reel rotor as claimed in claim 1, wherein said bearing seat is formed integrally with said mounting member.

3. The fishing reel rotor as claimed in claim 1, wherein each of said cover and said driving ring has an outer peripheral portion, which is formed integrally with a lug, said ends of said tension spring being fastened respectively to said lugs of said cover and said driving ring.

* * * * *